United States Patent Office 3,169,128
Patented Feb. 9, 1965

3,169,128
STEROIDAL 2β,3α-DIOL CYCLIC TRITHIO-
CARBONATE
Taichiro Komeno, Sumiyoshi-ku, Osaka-shi, Japan,
assignor to Shionogi & Co., Ltd., Osaka, Japan
No Drawing. Filed Dec. 17, 1962, Ser. No. 244,878
Claims priority, application Japan, Dec. 19, 1961,
36/46,267
6 Claims. (Cl. 260—239.5)

This invention relates to steroids and production thereof. More particularly, it relates to steroidal cyclic trithiocarbonates and production thereof.

The said steroidal cyclic trithiocarbonates are intended to mean the steroids having the partial structural formula:

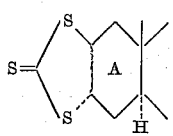

(I)

It is an object of the present invention to embody the said steroidal cyclic trithiocarbonates. Another object of this invention is to embody a generally applicable process for the conversion of a 2,3-epithio-steroid into the corresponding cyclic trithiocarbonate. A further object of this invention is to embody steroidal cyclic trithiocarbonates having specific pharmacological activities. These and other objects will be apparent to those skilled in the art to which the present invention pertains from the subsequent description.

The process of the present invention is representable by the following partial formula scheme showing only the A-ring of the steroid skeleton:

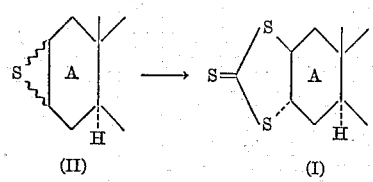

wherein the ripple mark (∫) represents α- or β-configuration.

The process of the present invention is generally applicable to 2,3-epithio-steroids having the partial structure of Formula II. The steric configuration of the epithio group on the A-ring of the starting 2,3-epithio-steroid has substantially no effect on the reaction; that is, the epithio group may have α- or β-configuration. Furthermore, such substituents which do not exert any substantial effect on the reaction, as 11-hydroxyl, 16-alkyl and 17-side chain, may exist at any position on the B-, C- or D-ring of the starting material. Examples of 2,3-epithio-steroids available as starting compounds include 2α,3α-epithio-5α-cholestane,
2β,3β-epithio-5α-cholestane,
2α,3α-epithio-5α-cholanic acid,
methyl 2β,3β-epithio-5α-cholanate,
2α,3α-epithio-25D-5α-spirostane,
2β,3β-epithio-5α-androstan-17β-ol 17-acetate,
2α,3α-epithio-5α-androstan-17β-ol 17-propionate
2β,3β-epithio-5α-androstan-17-one,
2α,3α-epithio-5α-pregnane-11β,17α,21-triol 21-acetate,
2α,3α-epithio-5α-pregnan-20-one,
2β,3β-epithio-5α-pregnan-11β-ol-20-one,
2β,3β-epithio-5α-pregnane-11β,17α,21-triol-20-one,
2β,3β-epithio-5α-pregnane-11β,17α,21-triol-20-one 21-acetate, etc.

These 2,3-epithio-steroids can be prepared from the corresponding 2,3-epoxy-steroids according to the following scheme showing only the A-ring of the steroid skeleton:

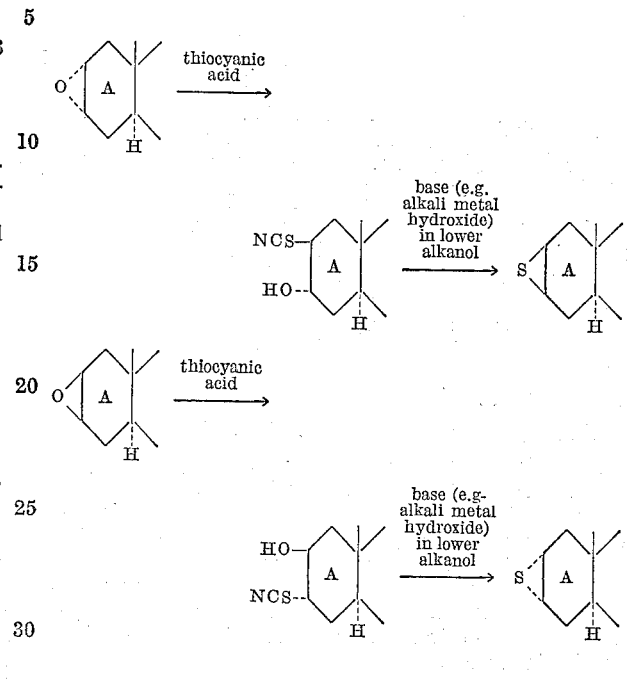

According to the process of the present invention, the starting 2,3-epithio-steroid is reacted with alkali metal o-(lower)alkyldithiocarbonate while heating (usually refluxing) to give the corresponding cyclic trithiocarbonate. The alkali metal o-(lower)alkyldithiocarbonate is readily prepared by mixing carbon disulfide, lower alkanol (e.g. methanol, ethanol, propanol) and alkali metal (e.g. sodium, potassium), and the thus-prepared alkali metal o-(lower)alkyldithiocarbonate solution may be employed in the process of the present invention as it is.

The thus-obtained cyclic trithiocarbonates having the partial structure of Formula I exhibit specific pharmacological activities. For instance, 17β-acetyloxy-5α-androstane-2β,3α-diol cyclic trithiocarbonate produced marked inhibition of gonadotropin at a total dose of 1 milligram in the test using mice. Accordingly, these products may be useful as controlling agents for diseases of menopause, ovulation-inhibition agents and controlling agents for hypergonadism or precocious puberty.

The following examples set forth illustratively presently-preferred embodiments of the invention. In these examples, mg.=milligram(s), g.=gram(s), and ml.=millilitre(s). Other abbreviations each have a conventional meaning.

EXAMPLE 1

Preparation of 5α-cholestane-2β,3α-diol cyclic trithiocarbonate

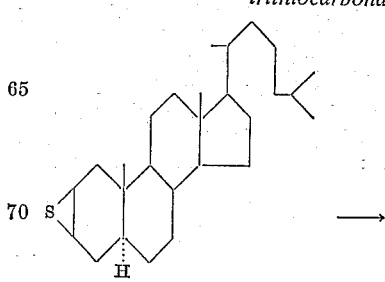

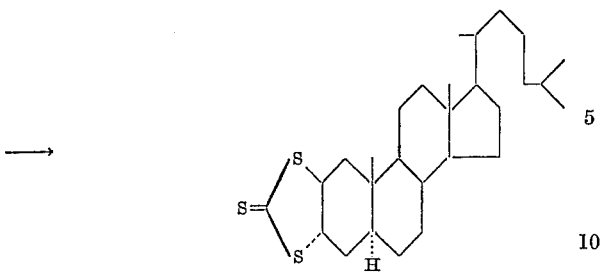

To a solution of potassium hydroxide (7 g.) in a mixture of methanol (50 ml.) and carbon disulfide (17 ml.), there is added 2β,3β-epithio-5α-cholestane (2.070 g.), and the resultant mixture is refluxed for 24 hours. After driving out carbon disulfide, water is added to the reaction mixture. The precipitated substance is collected by filtration and chromatographed on alumina (60 g.). The eluate (1.940 g.) from a mixture of petroleum ether and benzene (19:1–9:1) is crystallized from a mixture of ether and ethanol to give 5α-cholestane-2β,3α-diol cyclic trithiocarbonate (1.318 g.) as yellow leaflets melting at 132 to 133° C.

U.V.: $\lambda_{max.}^{ethanol}$ 319 mμ ($\epsilon$:16,310). I.R.: $\nu_{max.}^{Nujol}$ 1062 cm.$^{-1}$ Analysis.—Calcd. for $C_{28}H_{46}S_3$: C, 70.23; H, 9.68; S, 20.09. Found: C, 70.30; H, 9.77; S, 20.19.

The starting material of this example, 2β,3β-epithio-5α-cholestane, can be prepared by reacting 2α,3α-epoxy-5α-cholestane [Fieser et al.: Steroids, page 254] with an ethereal solution of thiocyanic acid at room temperature (around 15° C.), followed by refluxing the resultant 2β-thiocyanato-3α-hydroxy-5α-cholestane with potassium hydroxide in ethanol.

EXAMPLE 2

Preparation of 5α-cholestane-2β,3α-diol cyclic trithiocarbonate

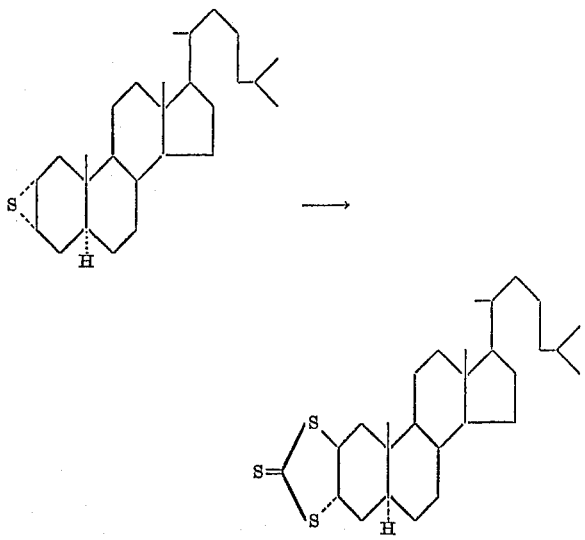

To a solution of potassium hydroxide (4 g.) in a mixture of methanol (30 ml.) and carbon disulfide (10 ml.), there is added 2α,3α-epithio-5α-cholestane (949 mg.), and the resultant mixture is reacted and treated as in Example 1 to give 5α-cholestane-2β,3α-diol cyclic trithiocarbonate (545 mg.) as yellow leaflets melting at 132 to 133° C.

The starting material of this example, 2α,3α-epithio-5α-cholestane, can be prepared by reacting 2β,3β-epoxy-5α-cholestane [Fieser et al.: Steroids, page 252] with an ethereal solution of thiocyanic acid at room temperature (around 15° C.), followed by refluxing the resultant 2β-hydroxy-3α-thiocyanato-5α-cholestane with potassium hydroxide in methanol.

EXAMPLE 3

Preparation of 17β-acetyloxy-5α-androstane-2β,3α-diol cyclic trithiocarbonate

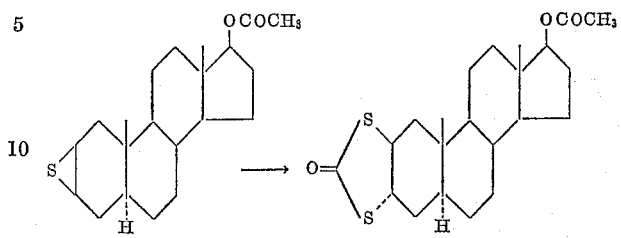

To a solution of potassium hydroxide (5 g.) in a mixture of methanol (30 ml.) and carbon disulfide (12 ml.), there is added 2β,3β-epithio-5α-androstan-17β-ol 17-acetate (1.407 g.), and the resultant mixture is refluxed for 43 hours. After addition of water to the reaction mixture, the resultant mixture is shaken with chloroform. The chloroform extract is washed with water, dried and evaporated. The residue (1.453 g.) is mixed with pyridine (10 ml.) and acetic anhydride (5 ml.), allowed to stand overnight and treated in a conventional manner to give an amorphous substance (1.478 g.). This substance is chromatographed on alumina (40 g.). The eluate (946 mg.) from a mixture of petroleum ether and benzene (4:1, 2:1, 1:1) is crystallized from ether and recrystalized from a mixture of chloroform and ethanol to give 17β-acetyloxy-5α-androstane-2β,3α-diol cyclic trithiocarbonate (800 mg.) as yellow leaflets melting at 199 to 200° C.

U.V.: $\lambda_{max.}^{ethanol}$ 320 mμ ($\epsilon$:16,820). I.R.: $\nu_{max.}^{Nujol}$ 1730, 1251, 1066

Analysis.—Calcd. for $C_{22}H_{32}O_2S_3$: C, 62.22; H, 7.60; S, 22.65. Found: C, 62.05; H, 7.62; S, 22.54.

The starting material of this example, 2β,3β-epithio-5α-androstan-17β-ol 17-acetate, can be prepared by reacting 2α,3α-epoxy-5α-androstan-17β-ol 17-acetate [J. Fajkos et al.: Chem. Abstracts, vol. 53, page 5342 (1959)] with an ethereal solution of thiocyanic acid at room temperature (around 15° C.), followed by refluxing the resultant 2β-thiocyanato-3α-hydroxy-5α-androstan-17β-ol 17-acetate with potassium hydroxide in ethanol.

In the similar manner, there are obtained other 17β-lower alkanoyloxy-5α-androstane-2β,3α-diol cyclic trithiocarbonates such as 17β-propionyloxy-5α-androstane-2β,3α-diol cyclic trithiocarbonate and 17β-butyryloxy-5α-androstane-2β,3α-diol cyclic trithiocarbonate.

What is claimed is:

1. Process for preparing a steroidal cyclic trithiocarbonate which comprises reacting a steroid wherein the A ring is substituted as follows:

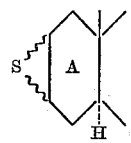

and which is selected from the group consisting of 2α,3α-epithio-5α-cholestane, 2β,3β-epithio-5α-cholestane, 2α,3α-epithio-5α-cholanic acid, methyl 2β,3β-epithio-5α-cholanate, 2α,3α-epithio-25D-5α-spirostane, 2β,3β - epithio-5α-androstan-17β-ol 17-acetate, 2α,3α-epithio-5α-androstan-17β-ol 17-propionate, 2β,3β-epithio-5α-androstan-17-one, 2α,3α - epithio-5α-pregnane-11β,17α,21-triol 21 - acetate, 2α,3α - epithio-5α-pregnan-20-one, 2β,3β-epithio-5α-pregnan-11β-ol-20-one, 2β,3β-epithio-5α-pregnane-11β,17α,21-triol-20-one, and 2β,3β-epithio-5α-pregnane - 11β,17α,21-triol-20-one 21-acetate, with an alkali metal o-(lower)-alkyldithiocarbonate in an inert solvent medium to give the corresponding steroid wherein the A ring is substituted as follows:

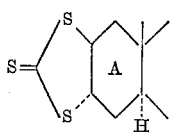

2. Process for preparing a steroidal cyclic trithiocarbonate which comprises reacting a steroid wherein the A ring is substituted as follows:

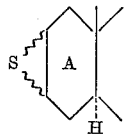

and which is selected from the group consisting of 2α,3α-epithio-5α-cholestane, 2β,3β-epithio-5α-cholestane, 2α,3α-epithio-5α-cholanic acid, methyl 2β,3β-epithio-5α-cholanate, 2α,3α-epithio-25D-5α-spirostane, 2β,3β - epithio-5α-androstan-17β-ol 17-acetate, 2α,3α-epithio-5α-androstan-17β-ol 17-propionate, 2β,3β-epithio-5α-androstan-17-one, 2α,3α-epithio-5α-pregnane-11β,17α,21-triol 21 - acetate, 2α,3α - epithio-5α-pregnan-20-one, 2β,3β-epithio-5α-pregnan-11β-ol-20-one, 2β,3β-epithio-5α-pregnane-11β,17α,21-triol-20-one, and 2β,3β-epithio-5α-pregnane - 11β,17α,21-triol-20-one 21-acetate, with a mixture of carbon disulfide, lower alkanol and alkali metal while refluxing to give the corresponding steroid wherein the A ring is substituted as follows:

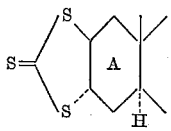

3. A 2β,3α-cyclic trithiocarbonate of a member selected from the group consisting of 5α-cholestane, 5α-cholanic acid, methyl 5α-cholanate, 25D-5α-spirostane, 5α-androstan-17β-ol 17-acetate, 5α-androstan-17β-ol 17-propionate, 5α-androstan - 17 - one, 5α-pregnane-11β,17α,21-triol 21-acetate, 5α-pregnan-20-one, 5α-pregnan-11β-ol-20-one, 5α-pregnane-11β,17α,21-triol-20-one, and 5α-pregnane-11β,17α,21-triol-20-one 21-acetate.

4. A steroid having the following formula:

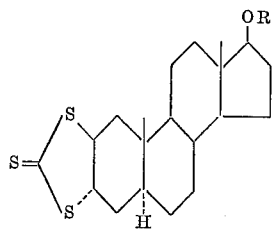

wherein R is lower alkanoyl.

5. A steroid having the following formula:

6. A steroid having the following formula:

References Cited in the file of this patent

Lightner et al.: "Chemistry and Industry," No. 27, July 27, 1962, pp. 1236–1237.